United States Patent
Nair et al.

(10) Patent No.: US 11,997,477 B2
(45) Date of Patent: May 28, 2024

(54) PREVENTION OF MALICIOUS ATTACKS VIA USER EQUIPMENT DEREGISTRATION PROCESS IN COMMUNICATION SYSTEM

(71) Applicant: Nokia Technologies Oy, Espoo (FI)

(72) Inventors: Suresh Nair, Whippany, NJ (US);
Nagendra Bykampadi, Bangalore (IN);
Anja Jerichow, Grafing bei München (DE)

(73) Assignee: Nokia Technologies Oy, Espoo (FI)

( * ) Notice: Subject to any disclaimer, the term of this patent is extended or adjusted under 35 U.S.C. 154(b) by 117 days.

(21) Appl. No.: 17/608,283

(22) PCT Filed: Apr. 30, 2020

(86) PCT No.: PCT/IB2020/054103
§ 371 (c)(1),
(2) Date: Nov. 2, 2021

(87) PCT Pub. No.: WO2020/225673
PCT Pub. Date: Nov. 12, 2020

(65) Prior Publication Data
US 2022/0217530 A1    Jul. 7, 2022

(51) Int. Cl.
*H04W 60/06* (2009.01)
*H04W 12/03* (2021.01)

(52) U.S. Cl.
CPC ........... *H04W 12/03* (2021.01); *H04W 60/06* (2013.01)

(58) Field of Classification Search
CPC .................................................. H04W 12/03
See application file for complete search history.

(56) References Cited

U.S. PATENT DOCUMENTS

2020/0267634 A1*  8/2020  Kim ..................... H04W 48/16
2022/0201638 A1*  6/2022  Arrobo Vidal ........ H04W 48/18

OTHER PUBLICATIONS

"3rd Generation Partnership Project; Technical Specification Group Core Network and Terminals; Non-Access-Stratum (NAS) protocol for 5G System (5GS); Stage 3; (Release 16)", 3GPP TS 24.501, V16.0.2, Mar. 2019, pp. 1-480.

(Continued)

*Primary Examiner* — Michael T Vu
(74) *Attorney, Agent, or Firm* — Barta Jones, PLLC

(57) ABSTRACT

Improved security management techniques between user equipment and a communication system are provided. For example, techniques are provided for preventing malicious attacks via a user equipment deregistration process. In one example, a method comprises sending a deregistration request message from the given user equipment to a communication system to which the given user equipment is registered, wherein the deregistration request message is security-protected and comprises a temporary identifier assigned to the given user equipment. By not sending the deregistration request message with a subscription concealed identifier, the given user equipment prevents a malicious actor from succeeding with a deregistration attack replaying the subscription concealed identifier. Furthermore, by ignoring a deregistration request message with a subscription concealed identifier, an access and mobility management element of the communication system prevents a malicious actor from succeeding with a deregistration attack replaying the subscription concealed identifier.

11 Claims, 8 Drawing Sheets

(56) References Cited

OTHER PUBLICATIONS

"3rd Generation Partnership Project; Technical Specification Group Services and System Aspects; System Architecture for the 5G System; Stage 2 (Release 16)", 3GPP TS 23.501, V16.0.2, Apr. 2019, pp. 1-317.
"3rd Generation Partnership Project; Technical Specification Group Services and System Aspects; Security architecture and procedures for 5G system (Release 15)", 3GPP TS 33.501, V15.4.0, Mar. 2019, pp. 1-187.
International Search Report and Written Opinion received for corresponding Patent Cooperation Treaty Application No. PCT/IB2020/054103, dated Jul. 15, 2020, 12 pages.
"5G; Non-Access-Stratum (NAS) protocol for 5G System (5GS); Stage 3 (3GPP TS 24.501 version 15.2.1 Release 15)", ETSI TS 124 501, V15.2.1, Apr. 2019, 465 pages.
"P-CR 23.502 Fixing figure on De-registration", SA WG2 Meeting #123, S2-177337, Agenda: 6.5.2, LG Electronics, Oct. 23-27, 2017, pp. 1-3.
"Changes to clause 6.2.2.2.2 of AMF Deregistration", 3GPP TSG-SA WG3 LI Meeting #72, c3i190009, Agenda: 2.3, Nokia, Jan. 22-25, 2019, 3 pages.
European Application No. 20724571.3, European Office Action, dated Jul. 19, 2023, 4 pages.

\* cited by examiner

PREVENTION OF MALICIOUS ATTACKS VIA USER EQUIPMENT DEREGISTRATION PROCESS IN COMMUNICATION SYSTEM

RELATED APPLICATION

This application was originally filed as PCT Application No. PCT/IB2020/054103, filed on Apr. 30, 2020, which claims priority from Indian Application No. 201941017905, filed on May 4, 2019, each of which is incorporated herein by reference in its entirety.

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or other 3GPP access point referred to as a gNB in a 5G network, or a non-3GPP access point (e.g., wireless local area network or WLAN) as part of the 5G network. As is known, 3GPP stands for 3rd Generation Partnership Project. The access point (e.g., gNB) is illustratively part of an access network of the communication system. For example, in a 5G network, the access network is referred to as a 5G System and is described in 5G Technical Specification (TS) 23.501, V16.0.2, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.4.0, entitled "Technical Specification Group Services and System Aspects; Security Architecture and Procedures for the 5G System" the disclosure of which is incorporated by reference herein in its entirety, further describe security management details associated with a 5G network.

Still further, 5G Technical Specification (TS) 24.501, V16.0.2, entitled "Non-Access-Stratum (NAS) Protocol for 5G System (5GS); Stage 3," the disclosure of which is incorporated by reference herein in its entirety, describes mobility management between the UE and the access and mobility management function (AMF) for both 3GPP access and non 3GPP access.

Security management is an important consideration in any communication system. For example, security between the UE and the AMF is an important but challenging task.

SUMMARY

Illustrative embodiments provide improved security management techniques between user equipment and a communication system. For example, embodiments provide techniques for preventing malicious attacks via a user equipment deregistration process.

For example, in one illustrative embodiment, a method comprises sending a deregistration request message from the given user equipment to a communication system to which the given user equipment is registered, wherein the deregistration request message is security-protected and comprises a temporary identifier assigned to the given user equipment.

In another illustrative embodiment, a method comprises deciding at given user equipment to deregister from a communication system to which the given user equipment is registered, wherein the given user equipment has not been assigned a temporary identifier, and refraining by the given user equipment from sending a deregistration request message notifying the communication system of the decision to deregister.

In a further embodiment, a method comprises receiving at an access and mobility management entity a deregistration request message from given user equipment registered with a communication system with which the access and mobility management entity is associated, checking at the access and mobility management entity whether or not the deregistration request message is security-protected and comprises a temporary identifier assigned to the given user equipment, processing at the access and mobility management entity the deregistration request message when the deregistration request message is security-protected and comprises the temporary identifier, and ignoring the deregistration request message otherwise.

In yet another illustrative embodiment, a method comprises receiving a deregistration request message from given user equipment, checking whether or not the deregistration request message comprises a subscription concealed identifier, and ignoring the deregistration request message when the deregistration request message comprises the subscription concealed identifier.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, by not sending a deregistration request message with a subscription concealed identifier, the given user equipment prevents/avoids a malicious actor from succeeding with a deregistration attack replaying the subscription concealed identifier. Furthermore, by ignoring a deregistration request message with a subscription concealed identifier, an access and mobility management element of the communication system prevents a malicious actor from succeeding with a deregistration attack replaying the subscription concealed identifier.

These and other features and advantages of embodiments described herein will become more apparent from the accompanying drawings and the following detailed description.

DETAILED DESCRIPTION

Figure 1:
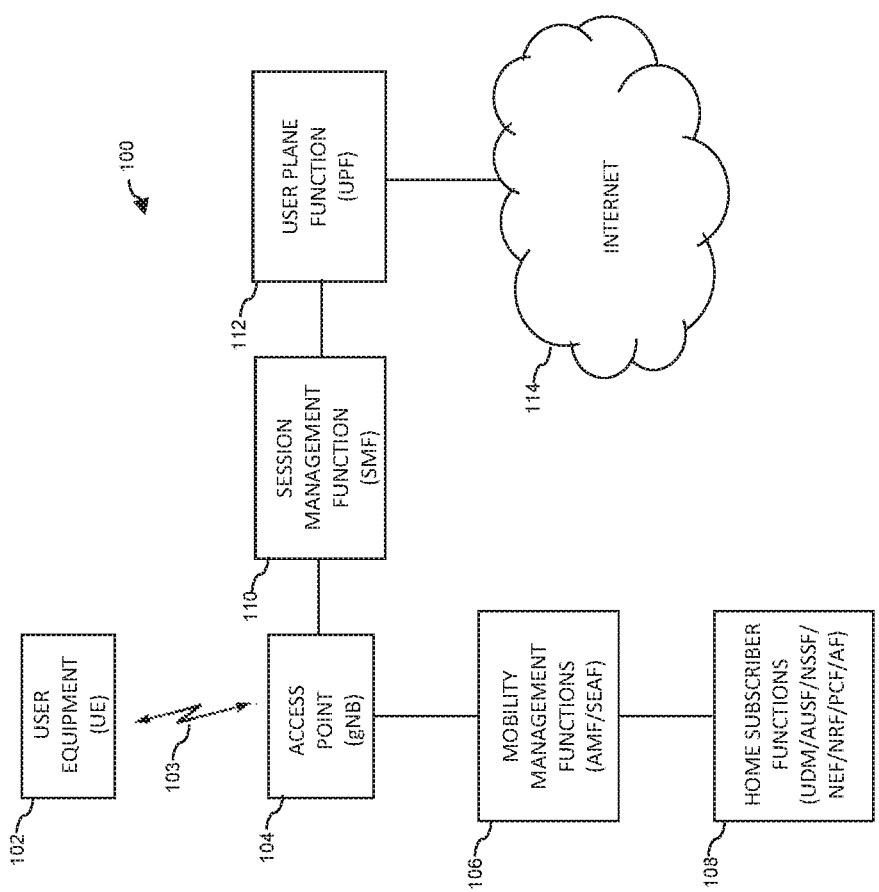
FIG. 1 illustrates a communication system with which one or more illustrative embodiments are implemented.

Embodiments will be illustrated herein in conjunction with exemplary communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501, 3GPP TS 33.501, and 3GPP TR 24.501. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (gNB) 104. Note that while FIG. 1 illustrates 3GPP access of the 5G System (5GS) through gNB 104, UE 102 can alternatively or additionally access a 5GS via a non 3GPP access point (e.g., WLAN as mentioned above).

The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and/or a device that executes ultra-reliable low latency communication (URLLC) application software where computing resources on the UE are limited or performance and timing requirements are very stringent. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The UICC may be removable, embedded (eUICC), or integrated (iUICC). The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5GS having a plurality of base stations and one or more associated radio network control functions. The base stations and radio network control functions in some embodiments are logically separate entities, but in some embodiments are implemented in the same physical network element, such as, for example, a base station router or cellular access point.

The access point 104 in this illustrative embodiment is operatively coupled to mobility management functions 106. In a 5GS, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Repository Function (NRF), Policy Control Function (PCF), and Application Function (AF).

Note that a UE, such as UE 102, is typically subscribed to what is referred to as a Home Public Land Mobile Network (HPLMN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of Protocol Data Unit (PDU) sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between NFs and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
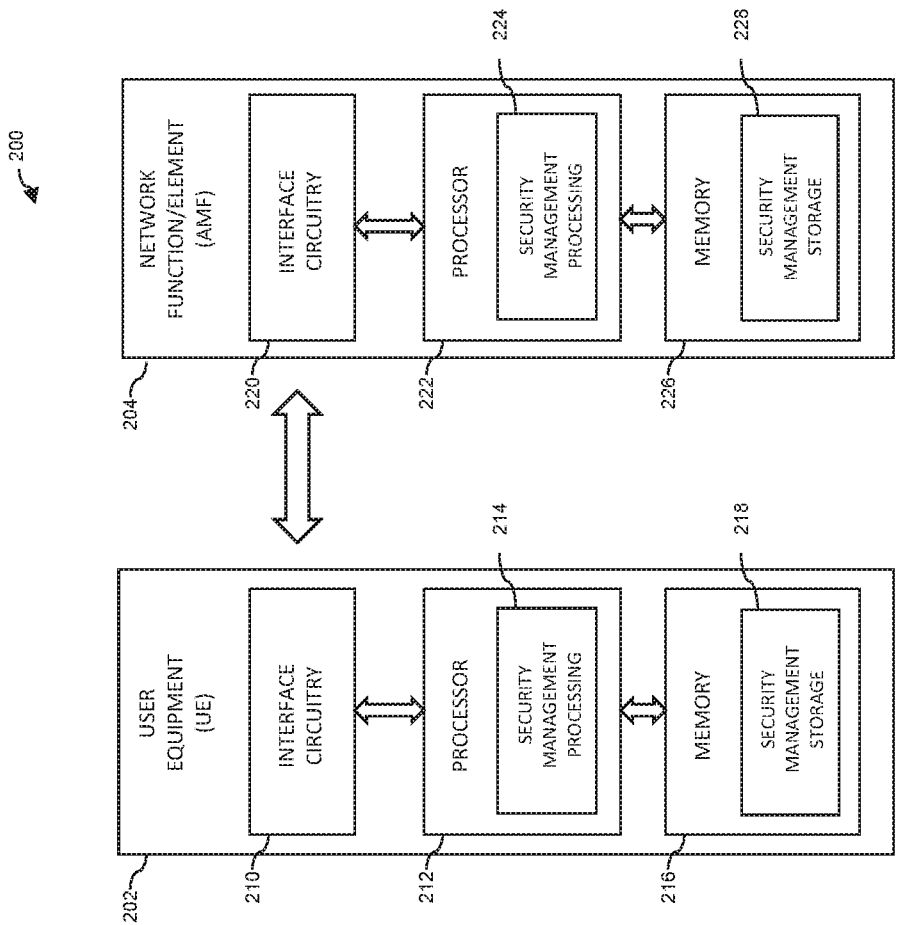
FIG. 2 illustrates user equipment and a network function/element configured for providing security management with which one or more illustrative embodiments are implemented.

FIG. 2 is a block diagram of user equipment and a network function/element configured for providing security management in an illustrative embodiment. More particularly, system 200 is shown comprising user equipment 202 and a network function/element 204. In illustrative embodiments, network function/element 204 represents an AMF.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with FIG. 3 below and otherwise herein. The memory 216 of the user equipment 202 includes a security management storage module 218 that stores data generated or otherwise used during security management operations.

The network function/element 204 comprises a processor 222 coupled to a memory 226 and interface circuitry 220. The processor 222 of the network function/element 204 includes a security management processing module 224 that may be implemented at least in part in the form of software executed by the processor 222. The processing module 224 performs security management described in conjunction with FIG. 3 below and otherwise herein. The memory 226 of the network function/element 204 includes a security management storage module 228 that stores data generated or otherwise used during security management operations.

The respective processors 212 and 222 of user equipment 202 and network function/element 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The respective memories 216 and 226 of user equipment 202 and network function/element 204 may be used to store one or more software programs that are executed by the respective processors 212 and 222 to implement at least a portion of the functionality described herein. For example, security management operations and other functionality as described in conjunction with FIG. 3-6 below and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The respective interface circuitries 210 and 220 of user equipment 202 and network function/element 204 illustratively comprise transceivers or other communication hardware or firmware that allows the associated system elements to communicate with one another in the manner described herein.

It is apparent from FIG. 2 that user equipment 202 is configured for communication with network function/element 204 and vice-versa via their respective interface circuitries 210 and 220. This communication involves user equipment 202 sending data to the network function/element 204, and network function/element 204 sending data to user equipment 202. However, in alternative embodiments, other network elements may be operatively coupled between, as well as to, user equipment 202 and network function/element 204, for example, a 3GPP access point (gNB) and/or a non 3GPP access point (WLAN) with an interworking function. The term "data" as used herein is intended to be construed broadly, so as to encompass any type of information that may be sent between user equipment and a network function/element including, but not limited to, messages, tokens, identifiers, keys, indicators, user data, control data, etc.

It is to be appreciated that the particular arrangement of components shown in FIG. 2 is an example only, and numerous alternative configurations are used in other embodiments. For example, user equipment and base stations can be configured to incorporate additional or alternative components and to support other communication protocols.

Other elements in a 5G network may each also be configured to include components such as a processor, memory and network interface. These elements need not be implemented on separate stand-alone processing platforms, but could instead, for example, represent different functional portions of a single common processing platform.

Figure 3:
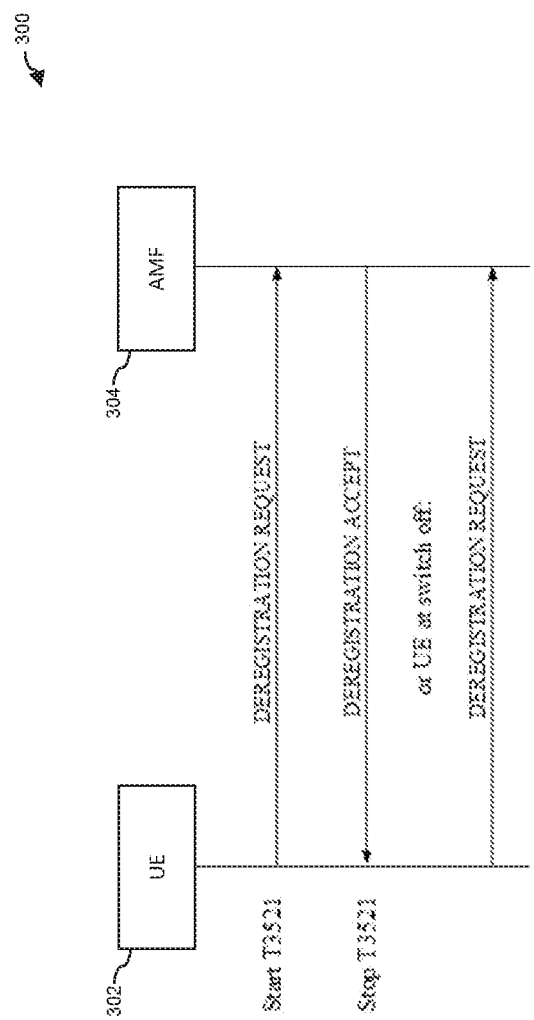
FIG. 3 illustrates a message flow associated with a user equipment deregistration process with which one or more illustrative embodiments are implemented.

As mentioned above, 3GPP TS 24.501 describes mobility management between the UE and the AMF for both 3GPP access and non 3GPP access. More particularly, TS 24.501 clauses 5.5.2.2.1 (initiation) and 5.5.2.2.2 (completion) describe a UE-initiated deregistration procedure. FIG. 3 depicts the UE-initiated deregistration procedure (initiation and completion) as process 300 for a UE 302 and an AMF 304.

The deregistration procedure is initiated by the UE 302 by sending a DEREGISTRATION REQUEST message. The Deregistration type information element (IE) included in the message indicates whether the deregistration procedure is due to a "switch off" or not. The access type included in the message indicates whether the deregistration procedure is:
 a) for 5GS services over 3GPP access when the UE is registered over 3GPP access only;
 b) for 5GS services over non-3GPP access when the UE is registered over non-3GPP access only; or
 c) for 5GS services over 3GPP access, non-3GPP access or both 3GPP access and non-3GPP access when the UE is registered in the same PLMN over both accesses.

If the UE 302 has a valid 5G-GUTI (Globally Unique Temporary Identifier), the UE 302 populates the 5GS mobile identity IE with the valid 5G-GUTI. If the UE 302 does not have a valid 5G-GUTI, the UE 302 populates the 5GS mobile identity IE with its SUCI as per the following scenarios:
 a) if timer T3519 is not running, generate a fresh SUCI as specified in the above-referenced 3GPP TS 33.501, send a DEREGISTRATION REQUEST message with the SUCI, start timer T3519 and store the value of the SUCI sent in the DEREGISTRATION REQUEST message; and b) if timer T3519 is running, send a DEREGISTRATION REQUEST message with the stored SUCI.

If the UE 302 does not have a valid 5G-GUTI and it does not have a valid SUCI, then the UE populates the 5GS mobile identity IE with its PEI (Permanent Equipment Identifier).

If the deregistration request is not due to switch off and the UE 302 is in the state 5GMM-REGISTERED or 5GMM-REGISTERED-INITIATED, timer T3521 is started in the UE 302 after the DEREGISTRATION REQUEST message has been sent. The UE 302 enters the state 5GMM-DEREGISTERED-INITIATED. Note that the "timers" referenced herein are mobility management timers defined in the 3GPP 5G documents cited herein or otherwise known to those of ordinary skill in the art. As such, explanations of the specific mobility management timers referenced herein are not further provided.

If the UE 302 is to be switched off, the UE 302 tries for a period of 5 seconds to send the DEREGISTRATION REQUEST message. During this period, the UE 302 may be switched off as soon as the DEREGISTRATION REQUEST message has been sent.

When the DEREGISTRATION REQUEST message is received by the AMF 304, the AMF 304 sends a DEREGISTRATION ACCEPT message to the UE 302, if the deregistration type IE does not indicate "switch off." Otherwise, the procedure is completed when the AMF 304 receives the DEREGISTRATION REQUEST message.

The UE 302, when receiving the DEREGISTRATION ACCEPT message, stops timer T3521, stops timer T3519 if running, and deletes any stored SUCI.

Illustrative embodiments realize that a security problem is created with this deregistration process, particularly with respect to the scenario labeled b) above wherein, if the UE 302 does not have a valid 5G-GUTI and if timer T3519 is running, the UE 302 populates the 5GS mobile identity IE in the DEREGISTRATION REQUEST message with the stored SUCI.

This scenario creates a direct malicious attack scenario against a valid UE, because in the very first Registration Request message there is no 5G-GUTI assigned to the UE. The UE creates an encrypted subscriber permanent identity (e.g., SUCI) and uses that as the subscriber identifier. Thus, an attacker UE observing the air interface can obtain the SUCI value and then send a deregistration request including the SUCI to the AMF. In response to the false deregistration request sent by the attacker UE, as per the defined behaviour in the current TS 24.501, the AMF will deregister the victim UE (UE from whom the SUCI was stolen) and abort the authentication procedure. This is considered a denial of service (DoS) type attack.

Illustrative embodiments provide techniques for preventing the attack described above using a stolen SUCI. More particularly, illustrative embodiments prevent this attack by not allowing the UE to send a deregistration request to the network using its SUCI. While timer T3519 is running (the TS 24.501 scenario labeled b) above), this is explicitly disallowed. After the completion of the Authentication procedure, the UE is admitted to the network and if the UE wants to deregister, sending deregistration request containing its SUCI is a problem as explained above. Determination of whether the SUCI is correct or not can be validated only by the UDM. Hence, to validate the SUCI, UDM needs to reauthenticate the UE by verifying that it indeed is the correct holder of the SUPI. Ultimately, this creates too much delay in the deregistration process, if the UE wants to deregister. Thus, illustrative embodiments realize that if the UE does not have a valid GUTI assigned and cannot protect its deregistration request message with its own security context, it is advantageous not to send any message and simply vanish without any indication to the network. The network will clean up the UE context by normal housekeeping procedures. Typical network functions/elements such as the AMF initiate context cleanup procedures when the UE is not responding positively to its messages, or when the messages from the UE are repeatedly failing the security verification or periodic Tracking Area Update (TAU) messages are missed.

Thus, to capture both scenarios (the TS 24.501 scenarios labelled a) and b) above), illustrative embodiments propose the following:

(i) Explicitly prohibit a UE from sending a deregistration request using its SUCI.

(ii) If the network (AMF) receives a deregistration request message containing a SUCI, the network does not process the message.

(iii) The UE and the network (AMF) use only a GUTI in the deregistration request message and the deregistration procedure, protected by the security context associated with the GUTI. For example, the use of the GUTI as a temporary identifier also means that the message containing the GUTI (in this case, the deregistration request message) is security-protected by the shared security context between the UE and the AMF. In one embodiment, the security protection of the message is achieved via a message authentication code (MAC) generated using the integrity key (which is generated as part of the shared security context).

(iv) If the UE does not have an assigned GUTI, it does not send a deregistration message, but rather the UE disappears from the network, if it wants to deregister from the network. For example, in one or more embodiments, "disappear from the network" means that the UE simply stops communicating with the network and thus takes no explicit steps to deregister.

The above procedures and features are depicted and further explained below in the context of FIGS. 4-6C with respect to a UE 402 and an AMF 404.

Figure 4:
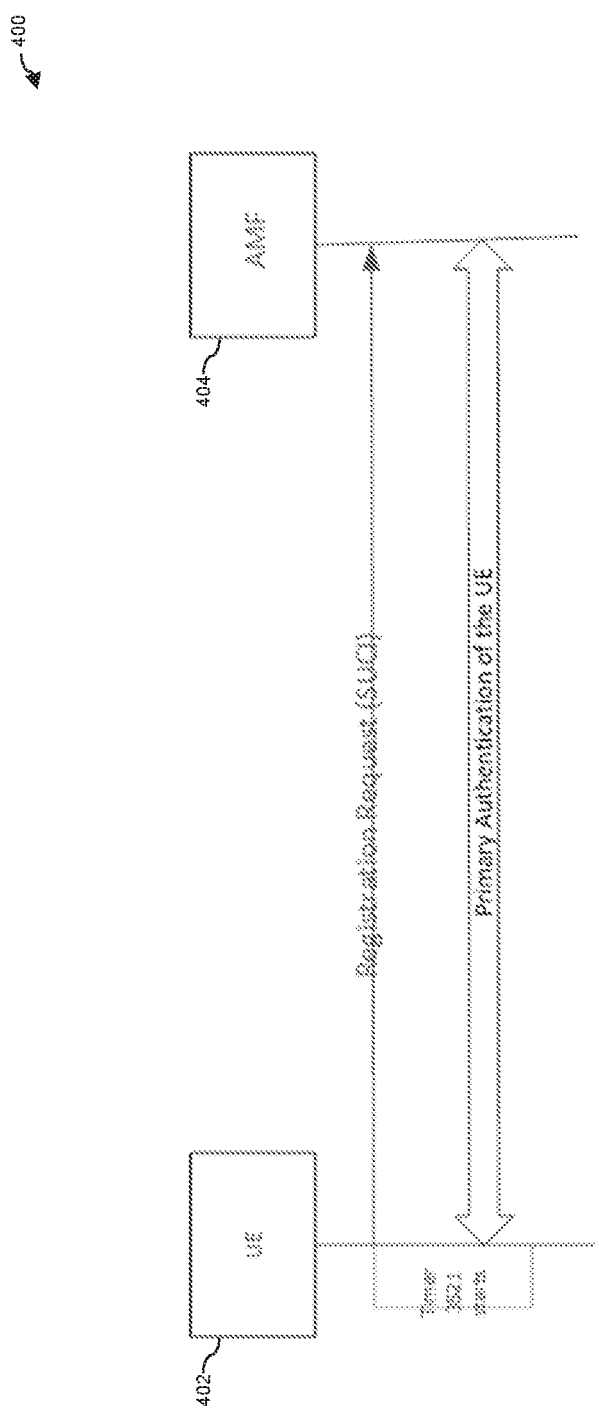
FIG. 4 illustrates a message flow associated with a user equipment registration process with which one or more illustrative embodiments are implemented.

First, a message flow 400 in FIG. 4 depicts the UE registration process. In the registration process as shown, UE 402 sends Registration Request with its SUCI to AMF 404. Note that timer 3521 starts. The UE 402 and the AMF 404 then perform primary authentication of the UE.

Figure 5:
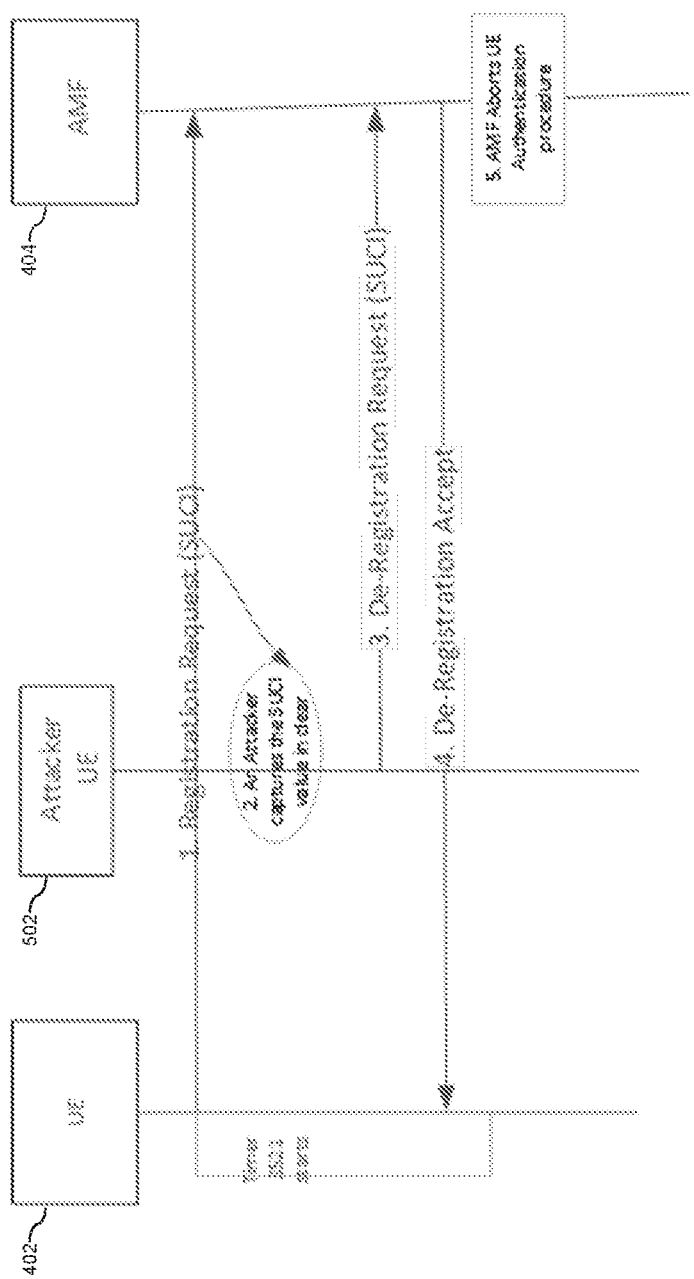
FIG. 5 illustrates a message flow associated with a malicious attack via a user equipment deregistration process with which one or more illustrative embodiments are implemented to prevent.

Turning now to FIG. 5, a message flow 500 depicts a malicious attack via a deregistration process as would occur with the existing deregistration process(es) defined in existing TS 24.501. In FIG. 5, step 1 depicts the UE 402 sending the Registration Request (same as FIG. 4) to AMF 404. In step 2, an attacker UE 502 captures the SUCI value in the clear (i.e., over the air interface between the UE 402 and the network access point (not expressly shown), e.g., gNB or WLAN). The attacker UE 502, in step 3, sends a Deregistration Request with the stolen SUCI to AMF 404 as per existing TS 24.501. AMF 404, assuming the deregistration request message came from UE 402, sends a Deregistration Accept to UE 402 (step 4), and aborts the UE authentication procedure (step 5). UE 402 is therefore denied access and thus service by the 5GS.

Figure 6A:
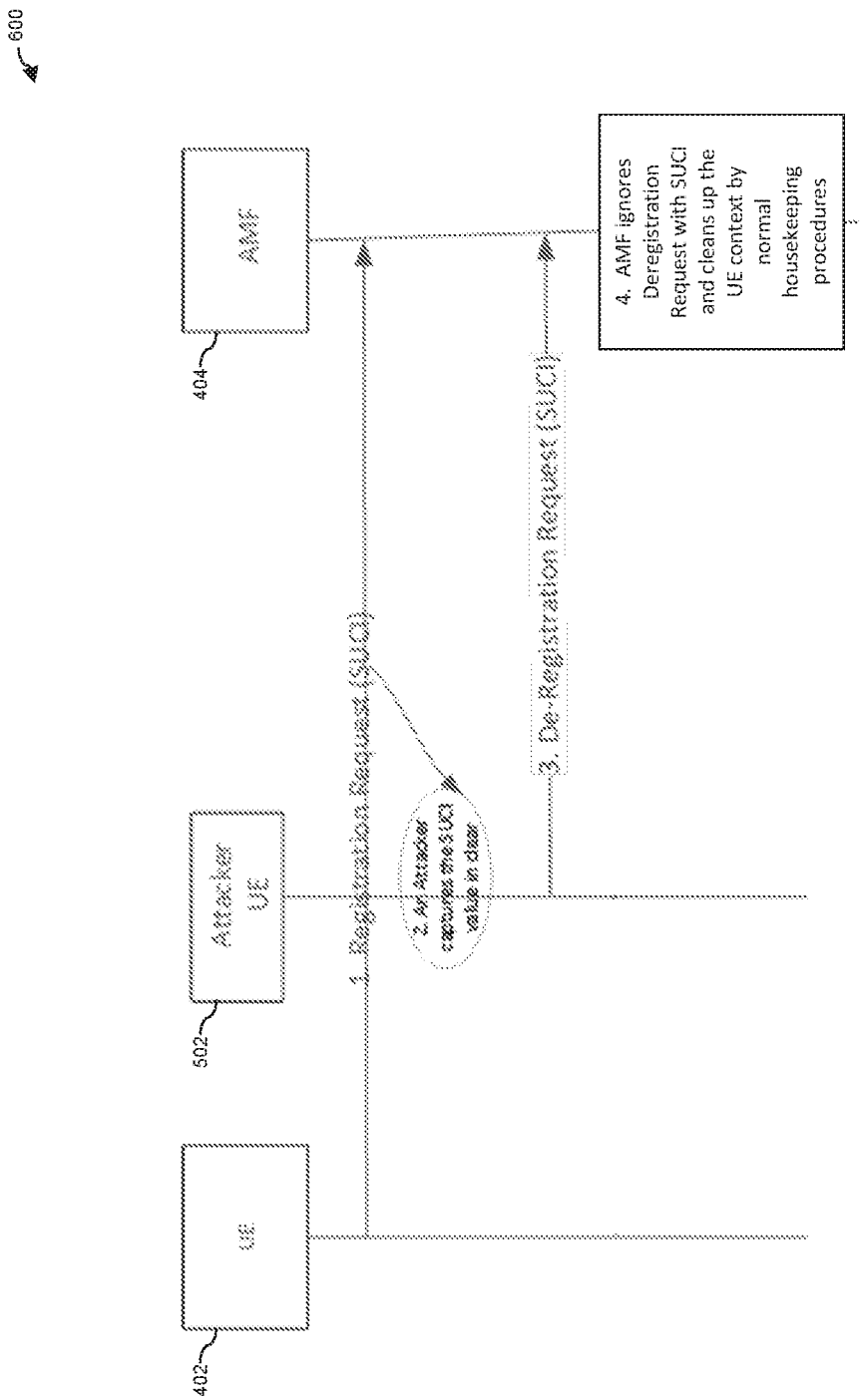
FIGS. 6A through 6C illustrate message flows associated with methodologies for preventing a malicious attack via a user equipment deregistration process according to illustrative embodiments.
Figure 6B:
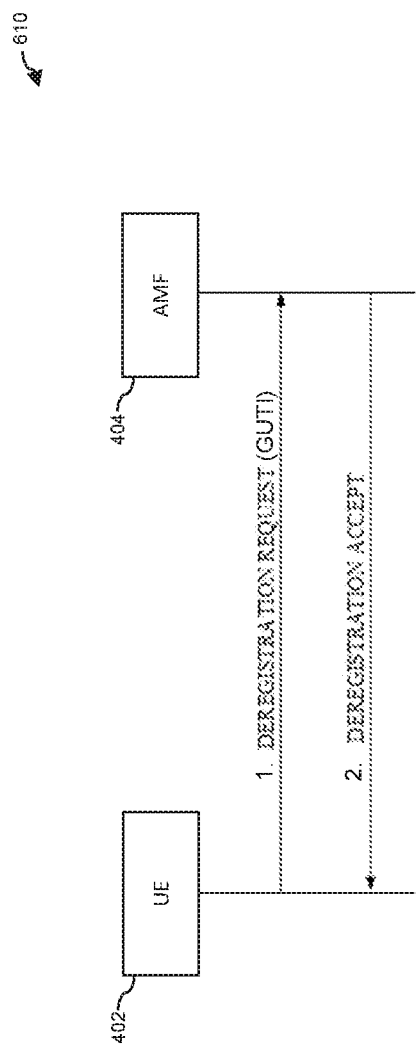
Figure 6C:
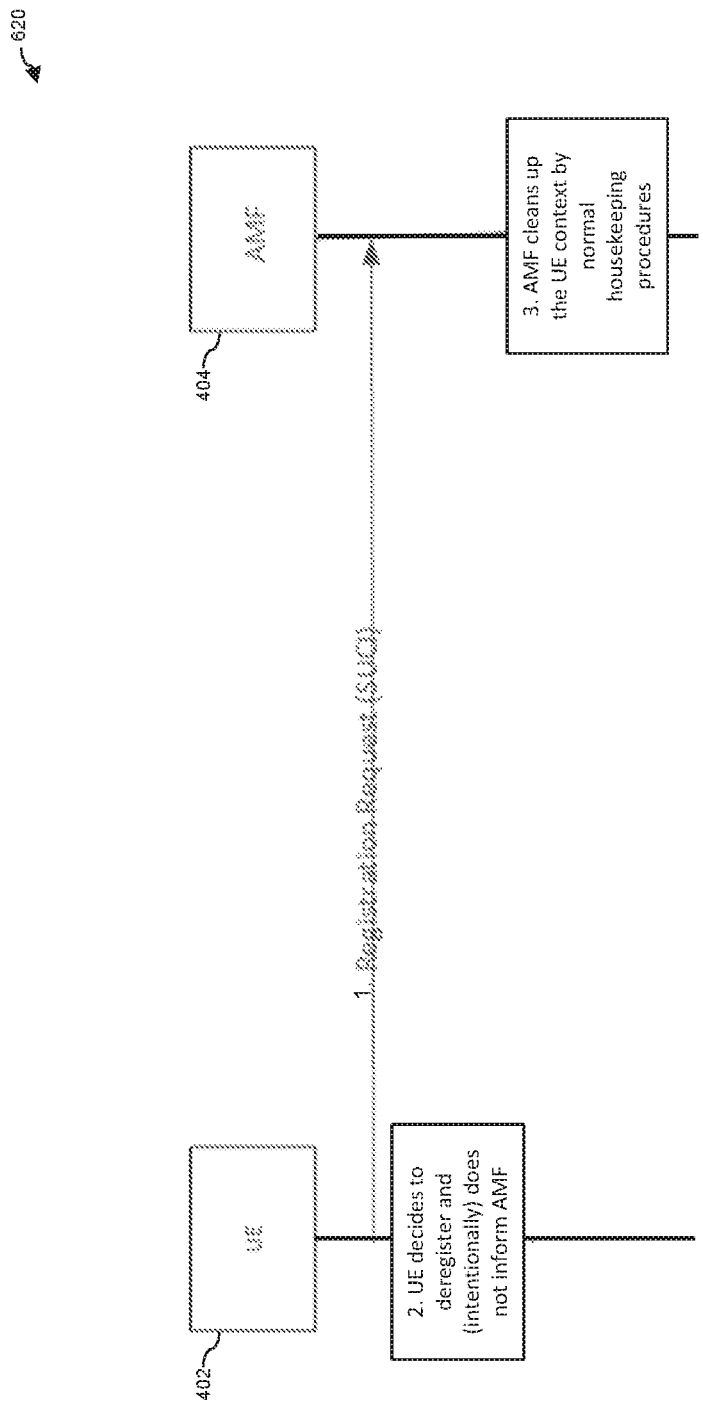

To overcome this problem, FIGS. 6A through 6C illustrate message flows associated with methodologies for preventing the malicious action of attacker UE 502, according to illustrative embodiments.

More particularly, in methodology 600 of FIG. 6A, assume that steps 1, 2 and 3 are the same as described above in FIG. 5. Now, rather than AMF 404 responding to the false deregistration request from attacker UE 502, AMF 404 is configured to ignore any deregistration request that is received that includes a SUCI. AMF 404 then clean ups the UE (402) context by normal housekeeping procedures as mentioned above.

In another embodiment for preventing a deregistration procedure attack, FIG. 6B depicts a methodology 610 wherein UE 402 sends a deregistration request message to AMF 404 (step 1) with a GUTI and that is security-protected (e.g., MAC). AMF 404 is configured to check that the request is security-protected and includes a GUTI, process the deregistration request when it is/does (ignore it otherwise), and send an acceptance message (step 2) back to UE 402 when successfully processed.

Thus, even if attacker UE 502 obtains the SUCI of UE 402 during the registration process of UE 402 and sends a false deregistration request with the stolen SUCI, AMF 404 will not respond as per methodology 600 in FIG. 6A.

In yet another embodiment for preventing a deregistration procedure attack, FIG. 6C depicts a methodology 620 wherein, after sending a registration request to AMF 404 (step 1), assume that UE 402 decides to deregister with the network but does not have an assigned GUTI. UE 402 then intentionally does not inform AMF 404 of its intention (step 2) and disappears from the network. AMF 404 then cleans up the UE context by normal housekeeping procedures (step 3) as mentioned above. Thus, by not participating in an explicit deregistration procedure with AMF 404, UE 402 achieves the same result (detaches from the network) and attacker UE 502 is rendered powerless to achieve any DoS attack on the network that would affect UE 402. It is to be appreciated that steps 2 and 3 can occur in arbitrary order or can happen at the same time.

Advantageously, illustrative embodiments overcome the above problems with the deregistration procedure of existing TS 24.501 and other problems when a malicious actor tries to replay a stolen SUCI from a UE.

The particular processing operations and other system functionality described in conjunction with the figures are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, network function/element configurations, registration/deregistration processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
at least one processor;
at least one memory including computer program code;
the at least one memory and the computer program code being configured to, with the at least one processor, cause the apparatus at least to:
send a registration with a Subscription Concealed Identifier (SUCI) for the apparatus to a mobile management function;
based on the SUCI, perform a primary authentication of the apparatus;
send a deregistration request message to a communication system comprising the mobile management function to which the apparatus is registered, wherein the deregistration request message is security-protected and comprises a temporary identifier assigned to the apparatus, the deregistration request message further comprises: a deregistration type information element that indicates whether a deregistration procedure is due to switch off or not, and an access type that indicates the deregistration procedure is a 5GS services over 3GPP access and a non-3GPP access when the apparatus is registered in a same public land mobile network over both the 3GPP access and the non-3GPP access; and
based on the deregistration request not including the SUCI, receive a deregistration accept message from the mobility management function.

2. The apparatus of claim 1, based on the apparatus not having a valid 5G global unique temporary identifier (5G-GUTI), send the registration with the SUCI.

3. The apparatus of claim 1, wherein the temporary identifier is a globally unique temporary identifier (GUTI) and the security protection is via a message authentication code.

4. A method comprising:
sending a registration with a Subscription Concealed Identifier (SUCI) for a user equipment to a mobile management function;
based on the SUCI, performing a primary authentication of the user equipment;
sending a deregistration request message from the user equipment to a communication system comprising the mobile management function to which the user equipment is registered, wherein the deregistration request message is security-protected and comprises a temporary identifier assigned to the user equipment, the deregistration request message further comprises: a deregistration type information element that indicates whether a deregistration procedure is due to switch off or not, and an access type that indicates the deregistration procedure is a 5GS services over 3GPP access and a non-3GPP access when the apparatus is registered in a same public land mobile network over both the 3GPP access and the non-3GPP access;
based on the deregistration request not including the SUCI, receiving a deregistration accept message from the mobility management function.

5. The method of claim 4, based on the apparatus not having a valid 5G global unique temporary identifier (5G-GUTI), send the registration with the SUCI.

6. The method of claim 4, wherein the temporary identifier is a globally unique temporary identifier (GUTI) and the security protection is via a message authentication code.

7. The method of claim 4, wherein the communication system is a 5G system.

8. A system comprising:
a user equipment comprising:
at least one processor;
at least one memory including computer program code;

the at least one memory and the computer program code being configured to, with the at least one processor, cause the user equipment at least to:

send a registration with a Subscription Concealed Identifier (SUCI) for the user equipment to a mobile management function;

based on the SUCI, performing a primary authentication of the user equipment;

send a deregistration request message to a communication system comprising the mobile management function to which the user equipment is registered, wherein the deregistration request message is security-protected and comprises a temporary identifier assigned to the user equipment, the deregistration request message further comprises: a deregistration type information element that indicates whether a deregistration procedure is due to switch off or not, and an access type that indicates the deregistration procedure is a 5GS services over 3GPP access and a non-3GPP access when the user equipment is registered in a same public land mobile network over both the 3GPP access and the non-3GPP access;

based on the deregistration request not including the SUCI, receiving a deregistration accept message from the mobility management function.

9. The system of claim 8, wherein, based on the apparatus not having a valid 5G global unique temporary identifier (5G-GUTI), populating a 5GS mobile identity with the SUCI.

10. The system of claim 9, wherein the user equipment is prohibited from sending the deregistration request message with the SUCI.

11. The system of claim 10, wherein when another user equipment does not have an assigned global unique temporary identifier, the other user equipment does not send a deregistration message and disappears from network to deregister from the network.

* * * * *